United States Patent
Shin et al.

(10) Patent No.: US 9,599,403 B2
(45) Date of Patent: Mar. 21, 2017

(54) COOLING TOWER HAVING PLUME ABATING MEANS

(71) Applicant: SAMSUNG ENGINEERING CO., LTD., Seoul (KR)

(72) Inventors: Sang Moo Shin, Yongin-si (KR); Hyun Ho Lee, Yongin-si (KR); Sung Soo Choi, Osan-si (KR); Young A. Choi, Osan-si (KR); Young Shin Jeon, Suwon-si (KR); Hyun Soo Park, Suwon-si (KR)

(73) Assignee: SAMSUNG ENGINEERING CO., LTD., Seoul (KR)

( * ) Notice: Subject to any disclaimer, the term of this patent is extended or adjusted under 35 U.S.C. 154(b) by 105 days.

(21) Appl. No.: 14/817,759

(22) Filed: Aug. 4, 2015

(65) Prior Publication Data
US 2016/0033203 A1 Feb. 4, 2016

(30) Foreign Application Priority Data

Aug. 4, 2014 (KR) .................. 10-2014-0099979
Sep. 29, 2014 (KR) .................. 10-2014-0130336

(51) Int. Cl.
*B01F 3/04* (2006.01)
*F28C 1/16* (2006.01)

(52) U.S. Cl.
CPC ............ *F28C 1/16* (2013.01); *B01F 3/04049* (2013.01); *B01F 3/04078* (2013.01); *B01F 3/04468* (2013.01)

(58) Field of Classification Search
CPC .... B01F 3/04; B01F 3/04021; B01F 3/04049; B01F 3/04078; B01F 3/04468

(Continued)

(56) References Cited

U.S. PATENT DOCUMENTS 2,680,603 A * 6/1954 Taylor ................. F28C 1/02
261/22

FOREIGN PATENT DOCUMENTS

JP     54139148 A * 10/1979
JP     60086381 A * 5/1985

(Continued)

OTHER PUBLICATIONS

Notice of Allowance dated Jun. 29, 2015 of Korean Patent Application No. 10-2014-0130336.

*Primary Examiner* — Robert A Hopkins
(74) *Attorney, Agent, or Firm* — Buchanan Ingersoll & Rooney PC

(57) ABSTRACT

A cooling tower having plume abating means is disclosed. The cooling tower disclosed herein includes: a housing; a cooling unit disposed inside of the housing and configured to convert high-temperature cooling water into low-temperature cooling water by contacting it with ambient air, wherein the cooling unit includes a wet unit and a dry unit that limit or block transfer of materials therebetween; a cooling water distributing unit disposed on top of the cooling unit and configured to spray cooling water to at least the wet unit of the cooling unit; a plume generating unit for generating plume by contacting first air discharged from the wet unit with second air discharged from the dry unit; a plume collecting unit disposed inside or outside of the housing and configured to collect plume generated in the plume generating unit; and an exhausting means disposed in a front end or back end of the plume collecting unit.

15 Claims, 6 Drawing Sheets

(58) Field of Classification Search
USPC .......................................... 261/117, DIG. 11
See application file for complete search history.

(56) References Cited

FOREIGN PATENT DOCUMENTS

| | | |
|---|---|---|
| JP | 01-025347 U | 2/1989 |
| KR | 10-0326722 B1 | 2/2002 |
| KR | 10-0548503 B1 | 1/2006 |
| KR | 10-2011-0047623 A | 5/2011 |
| KR | 10-1349114 B1 | 1/2014 |
| KR | 10-2014-0053048 A | 5/2014 |

\* cited by examiner

COOLING TOWER HAVING PLUME ABATING MEANS

CROSS-REFERENCE TO RELATED APPLICATIONS

This application claims the benefit of Korean Patent Application No. 10-2014-0099979, filed on Aug. 4, 2014, and Korean Patent Application No. 10-2014-0130336, filed on Sep. 29, 2014 in the Korean Intellectual Property Office, the disclosures of which are incorporated herein in their entirety by reference.

BACKGROUND

1. Field

One or more exemplary embodiments relate to a cooling tower having plume abating means, and more particularly, to a cooling tower having plume abating means that facilitates the generation of plume and removes the resulting plume before being discharged to the atmosphere.

2. Description of the Related Art

In general, a facility such as semiconductor manufacturing process is installed with a refrigerator for air-conditioning, and low-temperature cooling water is used in a condenser included in the refrigerator. As the refrigerator is operated, the temperature of the low-temperature cooling water rises, and thus the low-temperature cooling water is converted into high-temperature cooling water.

A cooling tower is a device for re-using high-temperature cooling water discharged from the refrigerator by contacting it with ambient air to cool down a temperature thereof. The cooling tower is classified into a counterflow cooling tower and a crossflow cooling tower. In the counterflow cooling tower, cooling water flows in gravity direction while the air flows in a direction exactly opposite to the flow direction of cooling water. In the crossflow cooling tower, cooling water flows in gravity direction while the air flows in a direction perpendicular to the flow direction of cooling water.

A conventional cooling tower is supplied with low-temperature ambient air during the winter season (e.g., air at a temperature of about −10° C. and a relative humidity of about 70%), and then generates high-temperature and humid air with increased temperature and relative humidity (e.g., air at a temperature of about 21° C. and a relative humidity of about 100%) while cooling high-temperature cooling water so as to obtain low-temperature cooling water. Here, the high-temperature and humid air generated in the cooling tower may be discharged to the outside of the cooling tower, and may be in contact with low-temperature ambient air (e.g., air at a temperature of about −10° C. and a relative humidity of about 70%), thereby generating plume. Since the plume is generated by condensation of the cooling water having water as a main component, the plume generated herein is harmless to the human body. However, the plume was seemingly recognized as a mixture containing harmful materials or pollutants, so that civil complaints are caused.

According to KR 1,349,114, there is disclosed a method of abating plume, the method including: forming water vapor by directly contacting high-temperature cooling water with ambient air in a cooling tower; and electrifying and collecting mist included in the formed water vapor.

According to KR 0,548,503, there is disclosed a method of removing plume, the method including: electrifying water vapor included in a chimney or in an exhaust gas of an exhaust pipe; and collecting the electrified water vapor.

According to KR 0,326,722, there is disclosed a method of abating plume, the method including: arranging a wet air duct and a dry air duct alternately and parallel to each other; and heating high-temperature and humid air with high-temperature and low-humid air to reduce a relative humidity of the high-temperature and humid air, wherein the high-temperature and humid air is discharged from the wet air duct and the high-temperature and low-humid air is discharged from the dry air.

SUMMARY

One or more exemplary embodiments include a plume-reducing cooling tower having plume abating means that facilitates the generation of plume and removes the resulting plume before being discharged to the atmosphere.

Additional aspects will be set forth in part in the description which follows and, in part, will be apparent from the description, or may be learned by practice of the presented embodiments.

According to one or more exemplary embodiments, a cooling tower includes: a housing; a cooling unit disposed inside of the housing and configured to convert high-temperature cooling water into low-temperature cooling water by contacting it with ambient air, wherein the cooling unit includes a wet unit and a dry unit that limit or block transfer of materials therebetween; a cooling water distributing unit for spraying cooling water to the cooling unit; a plume generating unit for generating plume by contacting first air with second air, wherein the first air is discharged from the wet unit and the second air is discharged from the dry unit; a plume collecting unit disposed inside or outside of the housing and configured to collect plume generated in the plume generating unit; and an exhausting means disposed in a front end or back end of the plume collecting unit.

The cooling tower may further include a cooling water blocking unit disposed between the cooling unit and the cooling water distributing unit and may be configured to block the cooling water sprayed from the cooling water distributing unit from flowing into the dry unit.

The wet unit and the dry unit may each have a thickness in a range of about 10 cm to about 300 cm.

The wet unit and the dry unit may each have a ratio of a thickness in a range of about 1:0.2 to about 0.2:1.

The first air may have temperature and relative humidity that are each higher than those of the second air.

The cooling tower may further include a material transferring means for transferring materials from the dry unit to the wet unit or from the wet unit to the dry unit.

The dry unit may include a first dry unit and a second dry unit, wherein the first dry unit is disposed at a bottom portion of the cooling water distributing unit and the second dry unit extends to the plume collecting unit.

In the cooling tower, a top portion of the second dry unit may be configured to protrude over a top portion of the plume collecting unit.

In the cooling tower, a top portion of the second dry unit may extend to a bottom portion of the plume collecting unit, to any one portion between bottom and top portions of the plume collecting unit, or to a top portion of the plume collecting unit.

The wet unit and the first dry unit may each have a thickness in a range of about 10 cm to about 300 cm, and the second dry unit may have a thickness in a range of about 5 cm to about 60 cm.

The plume collecting unit may include an electrostatic precipitator.

The plume collecting unit may be disposed on a top portion of the cooling water distributing unit.

The cooling tower may further include an air distribution regulator for regulating a proportion of air flowing into each of the wet unit and the dry unit.

The cooling tower may be configured to allow the ambient air to pass through the cooling unit, the plume generating unit, the cooling water distributing unit, and the plume collecting unit sequentially in the stated order.

The cooling tower may be configured to allow the ambient air to pass through the cooling unit, the plume generating unit and the plume collecting unit sequentially in the stated order, not via the cooling water distributing unit.

The cooling tower may be designed in a counterflow cooling tower, a crossflow cooling tower, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
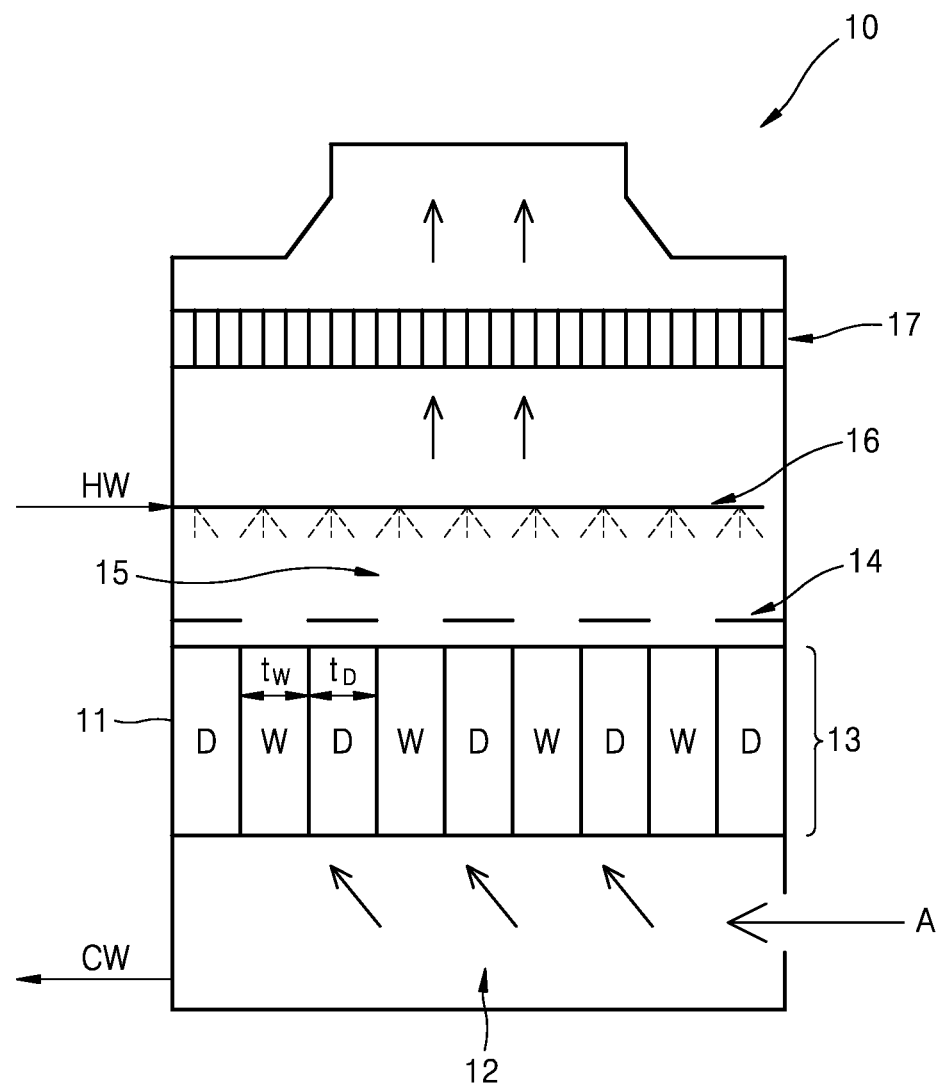
FIG. 1 is a diagram schematically illustrating a counterflow cooling tower having plume abating means according to an exemplary embodiment.

Reference will now be made in detail to embodiments of a cooling tower having plume abating means, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram schematically illustrating a cooling tower 10 having plume abating means according to an exemplary embodiment. In FIG. 1, arrows indicate a direction that ambient air (A) and air flow, or a direction that high-temperature cooling water (HW) and low-temperature cooling water (CW) flow.

Referring to FIG. 1, the cooling tower 10 includes a housing 11, an ambient air introducing/water collecting unit 12, a cooling unit 13, a plume generating unit 15, a cooling water distributing unit 16, a plume collecting unit 17, and an exhausting means (not shown).

The housing 11 may accommodate the ambient air introducing/water collecting unit 12, the cooling unit 13, the plume generating unit 15, the cooling water distributing unit 16, the exhausting means, and as an option, the plume collecting unit 17. In addition, when the cooling tower 10 includes a cooling water blocking unit 14 that will be described below, the housing 11 may accordingly accommodate the cooling water blocking unit 14.

Although not shown in FIG. 1, the housing 11 may include an ambient air inlet for entering ambient air A, an air outlet for discharging air from which plume is removed, a cooling water inlet for entering high-temperature cooling water HW, and a cooling water outlet for discharging low-temperature cooling water CW.

The ambient air inlet may be formed at a bottom portion and/or on a side portion of the housing 11, and the air outlet may be formed on a top portion of the housing 11. For example, the ambient air inlet may be intermittently or continuously formed along the bottom circumference of the housing 11.

The high-temperature cooling water HW may be water discharged from a refrigerator (not shown) that is installed in a semiconductor manufacturing process or the like. Here, the high-temperature cooling water HW may have a temperature in a range of about 10° C. to about 60° C.

The ambient air introducing/collecting unit 12 may be disposed inside of the housing 11, and is configured to provide a space for both an intake of the ambient air A through the ambient air inlet and a collection of the low-temperature cooling water CW discharged from the cooling unit 13. The ambient air A may have a temperature in a range of about −20° C. to about 50° C. and a relative humidity in a range of about 20% to about 80%.

The cooling unit 13 may be disposed to be in communication with the ambient air introducing/water collecting unit 12 to thereby convert the high-temperature cooling water HW into the low-temperature cooling water CW by contacting it with the ambient air A drawn from the ambient air introducing/water collecting unit 12. The cooling unit 13 may include at least one wet unit (W) and at least one dry unit (D), in which the transfer of materials is limited or blocked therebetween. Here, the low-temperature cooling water CW may have a temperature in a range of about 0° C. to about 40° C.

The high-temperature cooling water HW and the ambient air A drawn from the ambient air introducing/collecting unit 12 may pass through the cooling unit 13 in opposite directions to each other. In an exemplary embodiment, the high-temperature cooling water HW passes through the wet unit W in gravity direction, a part of the ambient air A passes through the wet unit W in a reverse direction to the gravity direction, and the rest of the ambient air A passes through the dry unit D in a reverse direction to the gravity direction.

The cooling tower 10, to control proportions of air flowing into each of the wet unit W and the dry unit D, may further include an air distribution regulator (not shown) that is disposed inside or outside of the ambient air introducing/water collecting unit 12.

The expression 'transfer of materials is limited or blocked' as used herein may be interpreted as follows: the movement of cooling water or air is limited or blocked; and a partition may be disposed between the wet unit W and the dry unit D to block the transfer of materials; or appropriate structures of the wet unit W and the dry unit D may be selected to exhibit a function of blocking the transfer of materials. Separately, heat flow may be limited or blocked, or in an exemplary embodiment, heat may flow smoothly between the wet unit W and the dry unit D.

In addition, the term 'top portion or top end' as used herein refers to a portion or an end positioned in a direction relatively reverse to the gravity direction, and the term 'bottom portion or bottom end' as used herein refers to a portion or an end positioned in a direction relatively towards the gravity direction.

The wet unit W and the dry unit D may each be disposed in a variety of numbers and structures. The number of the wet unit W may be identical to or different from the number of the dry unit D. In an exemplary embodiment, at least one wet unit W and at least one dry unit D may be arranged one by one alternately. In another exemplary embodiment, a plurality of wet units W may be arranged side by side in one or at least two row(s), and one dry unit D may be arranged to surround all of the plurality of wet units W. In another exemplary embodiment, a plurality of dry units D may be arranged side by side in one or at least two row(s), and one wet unit W may be arranged to surround all of the plurality of dry units D.

The wet unit W and the dry unit D may each include a filler, such as a plastic material, a metal, a piece of tree, a ceramic material, or mixtures of at least two thereof.

The wet unit W and the dry unit D may each have a thickness in a range of about 10 cm to about 300 cm. For example, the wet unit W may have a thickness ($t_W$) of about 50 cm and the dry unit D may have a thickness ($t_D$) of about 50 cm. However, the exemplary embodiment is not limited thereto, and the thickness $t_W$ of the wet unit W may be broadly varied so long as the high-temperature cooling water HW (at a temperature of about 28° C.), which passes through the wet unit W, is cooled below a pre-determined temperature (e.g., about 22° C.) by the contact with low-temperature ambient air A (at a temperature of about −10° C.). The thickness $t_D$ of the dry unit D may be also broadly varied so long as the temperature of the ambient air A, which passes through the dry unit D, is not increased to a pre-determined temperature (e.g., about 5° C.) by. However, it is important to determine the thickness $t_W$ of the wet unit W and the thickness $t_D$ of the dry unit D in full consideration of cooling efficiency of the cooling tower 10 and the extent of plume generation therein.

The wet unit W and the dry unit D may have a thickness ratio in a range of about 1:0.2 to about 0.2:1. For example, a ratio of the thickness $t_W$ of the wet unit W to the thickness of $t_D$ of the dry unit D may be about 1:1.

The first air and the low-temperature cooling water CW may be discharged from a top portion and a bottom portion of the wet unit W, respectively. The second air may be discharged from a top portion of the dry unit D. The low-temperature cooling water CW discharged from the bottom portion of the wet unit W may flow into the refrigerator (not shown) through the ambient air introducing/water collecting unit 12 to be re-used.

The first air may have relative humidity and temperature that are higher than those of the second air. Specifically, the first air receives excess heat and moisture from the high-temperature cooling water HW, thereby having temperature and relative humidity that are much higher than those of the ambient air A. The second air receives a little heat from the high-temperature cooling water HW, thereby having a temperature that is slightly higher than or similar with that of the ambient air A and a relative humidity that is slightly lower than or similar with that of the ambient air A.

The cooling water distributing unit 16 may be disposed on a top portion of the cooling unit 13, so as to spray the high-temperature cooling water HW onto at least the wet unit W of the cooling unit 13.

In an exemplary embodiment, the cooling water distributing unit 16 may be configured to spray the high-temperature cooling water HW onto the wet unit W of the cooling unit 13, but not to spray the high-temperature cooling water HW onto the dry unit D of the cooling unit 13. In this case, the cooling water distributing unit 16 may include at least one spray nozzle at a position corresponding to the wet unit W of the cooling unit 13, but may not include a spray nozzle at a position corresponding the dry unit D of the cooling unit 13.

In another exemplary embodiment, the cooling water distributing unit 16 may be configured to spray the high-temperature cooling water HW onto the top portions of both the wet unit W and the dry unit D of the cooling unit 13. In this case, as shown in FIG. 1, the cooling tower 10 may further include a cooling water blocking unit 14. The cooling water blocking unit 14 may be disposed between the cooling unit 13 and the cooling water distributing unit 16 to prevent the high-temperature cooling water HW sprayed from the cooling water distributing unit 16 from flowing into the dry unit D. The cooling water blocking unit 14 may include at least one flat plate or cap (not shown).

The plume generating unit 15 is a space formed between the cooling unit 13 and the plume collecting unit 17, wherein the first air discharged from the top portion of the wet unit W is in contact with the second air discharged from the top portion of the dry unit D, thereby generating plume. As described above, the first air has temperature and relative humidity that are much higher than those of the ambient air A, and the second air has temperature and relative humidity that are slightly higher than or similar with those of the ambient air A. Thus, when the first air is in contact with the second air, plume is rapidly generated, thereby forming the plume generating unit 15.

The plume collecting unit 17 may be disposed inside or outside of the housing 11 and on a top portion of the cooling water distributing unit 16 to collect plume generated in the plume generating unit 15.

The plume collecting unit 17 may include an electrostatic precipitator (not shown). The electrostatic precipitator electrifies plume by arc discharge, corona discharge or so on, and then, the electrified plume is adsorbed onto an electrode plate (not shown) having an opposite polarity to polarity of the electrified plume so as to be collected.

The air, from which the plume is removed, discharged from the cooling tower 10 may be exhausted to the atmosphere after passing through the plume collecting unit 17.

The plume (i.e., condensate), which is collected in the plume collecting unit 17, may flow back into the refrigerator (not shown) along with the low-temperature cooling water CW to be re-used.

The exhausting means may be disposed near the ambient air inlet 14 or the air outlet. The exhausting means may be an exhaust fan.

In addition, the exhausting means may be disposed on any position between top and bottom portions of the plume collecting unit 17.

Figure 2:
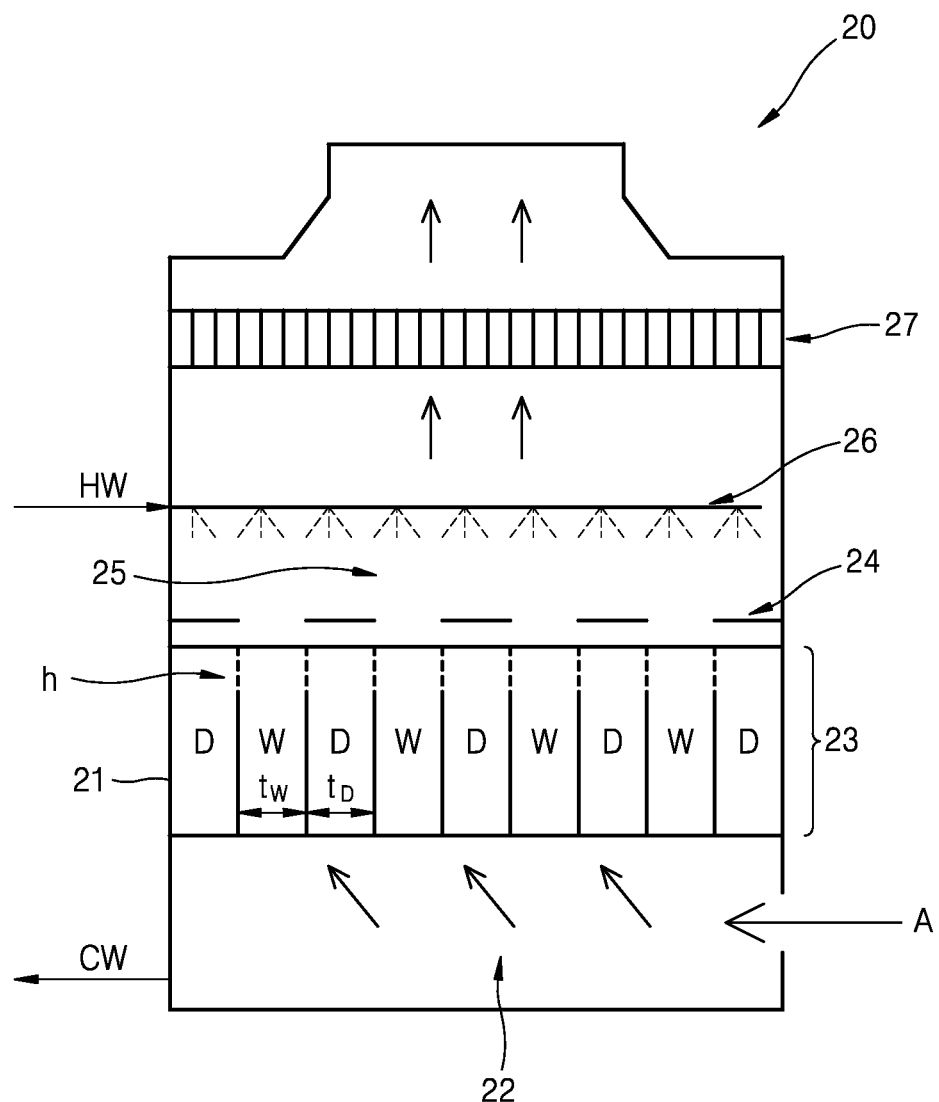
FIG. 2 is a diagram schematically illustrating a counterflow cooling tower having plume abating means according to another exemplary embodiment.

FIG. 2 is a diagram schematically illustrating a cooling tower having plume abating means 20 according to another exemplary embodiment.

Referring to FIG. 2, the cooling tower 20 includes a housing 21, an ambient air introducing/water collecting unit 22, a cooling unit 23, a plume generating unit 25, a cooling water distributing unit 26, a plume collecting unit 27, and an exhausting means. The exhausting means of the cooling tower 20 may be identical to or similar with the exhausting means of the cooling tower 10 in FIG. 1, and thus a detailed description thereof will be omitted.

In addition, the cooling tower 20 may further include a cooling water blocking unit 24 and/or the above-described air distribution regulator.

The housing 21, the ambient air introducing/water collecting unit 22, the cooling unit 23, the cooling water blocking unit 24, the plume generating unit 25, the cooling water distributing unit 26, and the plume collecting unit 27 of FIG. 2 may be respectively identical to or similar with the housing 11, the ambient air introducing/water collecting unit 12, the cooling unit 13, the cooling water blocking unit 14, the plume generating unit 15, the cooling water distributing unit 16, and the plume collecting unit 17 of FIG. 1, and thus, detailed descriptions thereof will be omitted.

The cooling tower 20 of FIG. 2 is different from the cooling tower 10 of FIG. 1 in that the cooling tower 20 may further include a material transferring means (e.g., at least one hole (h)) for transferring materials from a dry unit D to a wet unit W and/or from the wet unit W to the dry unit D of the cooling tower 20. The material transferring means may be disposed in an appropriate position in consideration of cooling efficiency of the cooling tower 20 and the extent of plume generation therein. The material transferring means may be configured to mix air of a dry unit D with air of a wet unit W in the cooling unit 23 that is positioned at a bottom portion of the plume generating unit 25, thereby adjusting temperature and relative humidity of the resulting mixed air to exhibit additional effects of the plume abatement.

Figure 3:
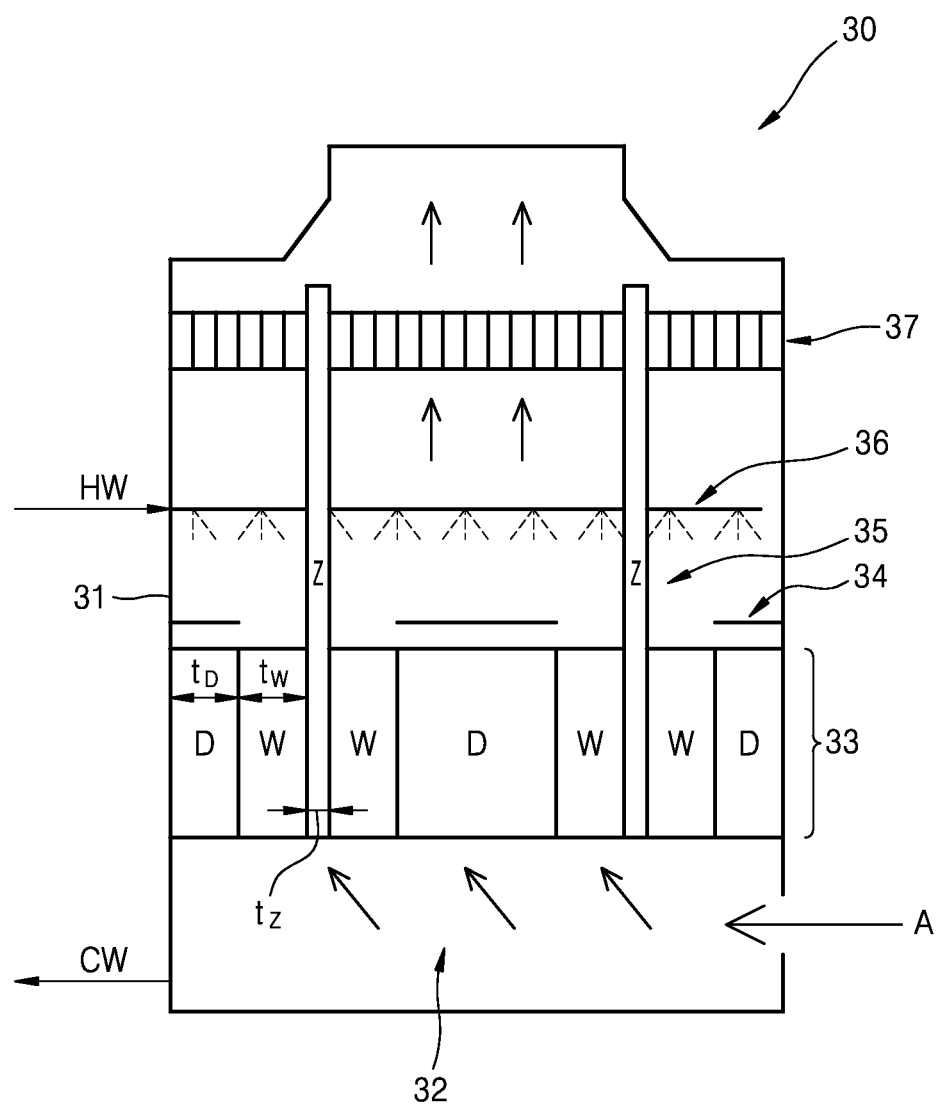
FIG. 3 is a diagram schematically illustrating a counterflow cooling tower having plume abating means according to another exemplary embodiment.

FIG. 3 is a diagram schematically illustrating a cooling tower having plume abating means 30 according to another exemplary embodiment.

Referring to FIG. 3, the cooling tower 30 includes a housing 31, an ambient air introducing/water collecting unit 32, a cooling unit 33, a plume generating unit 35, a cooling water distributing unit 36, a plume collecting unit 37, and an exhausting means (not shown). The exhausting means of the cooling tower 30 may be identical to or similar with the exhausting means of the cooling tower 10 in FIG. 1, and thus a detailed description thereof will be omitted.

In addition, the cooling tower 30 may further include a cooling water blocking unit 34 and/or the above-described air distribution regulator.

The housing 31, the ambient air introducing/water collecting unit 32, the cooling unit 33, the cooling water blocking unit 34, the plume generating unit 35, the cooling water distributing unit 36, and the plume collecting unit 37 of FIG. 3 may be respectively identical to or similar with the housing 11, the ambient air introducing/water collecting unit 12, the cooling unit 13, the cooling water blocking unit 14, the plume generating unit 15, the cooling water distributing unit 16, and the plume collecting unit 17 of FIG. 1, and thus, detailed descriptions thereof will be omitted.

The cooling tower 30 of FIG. 3 is different from the cooling tower 10 of FIG. 1 in that dry units (D and Z) of the cooling tower 30 consist of a first dry unit D and a second dry unit Z, wherein the first dry unit D is disposed between the ambient air introducing/water collecting unit 32 and the plume generating unit 35 and the second dry unit Z extends from the ambient air introducing/water collecting unit 32 to the plume collecting unit 37. In detail, a bottom end of the second dry unit Z is configured to be in contact with the ambient air introducing/water collecting unit 32, and a top end of the second dry unit Z is configured to protrude over a top end of the plume collecting unit 37. Accordingly, third air discharged from the second dry unit Z (having a high temperature and a low humidity) may be mixed with fourth air discharged from the plume collecting unit 37 (having a high temperature and a high humidity), thereby additionally reducing a relative humidity of the fourth air (i.e., the air discharged from the plume collecting unit 37). In this regard, when the resulting mixed air is exhausted to the atmosphere, the generation of plume may be also further reduced.

The wet unit W may have a thickness $t_W$ in a range of about 10 cm to about 300 cm, the first dry unit D may have a thickness $t_D$ in a range of about 10 cm to about 300 cm, and the second dry unit Z may have a thickness $t_Z$ in a range of about 5 cm to about 60 cm. For example, the thickness $t_W$ of the wet unit W and the thickness $t_D$ of the first dry unit D may each be about 50 cm, and the thickness $t_Z$ of the second dry unit Z may be about 10 cm. However, the exemplary embodiment is not limited thereto, and the thickness $t_W$ of the wet unit W may be broadly varied so long as the high-temperature cooling water HW passing through the wet unit W is cooled below a pre-determined temperature (e.g., about 22° C.) by the contact with the ambient air A. The thickness $t_D$ of the first dry unit D may be also broadly varied so long as the temperature of the ambient air A passing through the first dry unit D does not increase to a pre-determined temperature (e.g., about 0° C.), and the thickness $t_Z$ of the second dry unit Z may be broadly varied so long as the temperature of the ambient air A passing through the second dry unit Z increases to a pre-determined temperature (e.g., about 10° C.) or higher. Here, it is important to determine the thickness $t_W$ of the wet unit W, the thickness $t_D$ of the first dry unit D, and the thickness $t_Z$ of the second dry unit Z in full consideration of cooling efficiency of the cooling tower 30.

In addition, although not shown in FIG. 3, the cooling tower 30 of FIG. 3 may further include a material transferring means (e.g., at least one hole h) for transferring materials from the first dry unit D to the wet unit W and/or from the wet unit W to the first dry unit D of the cooling tower 30.

Figure 4:
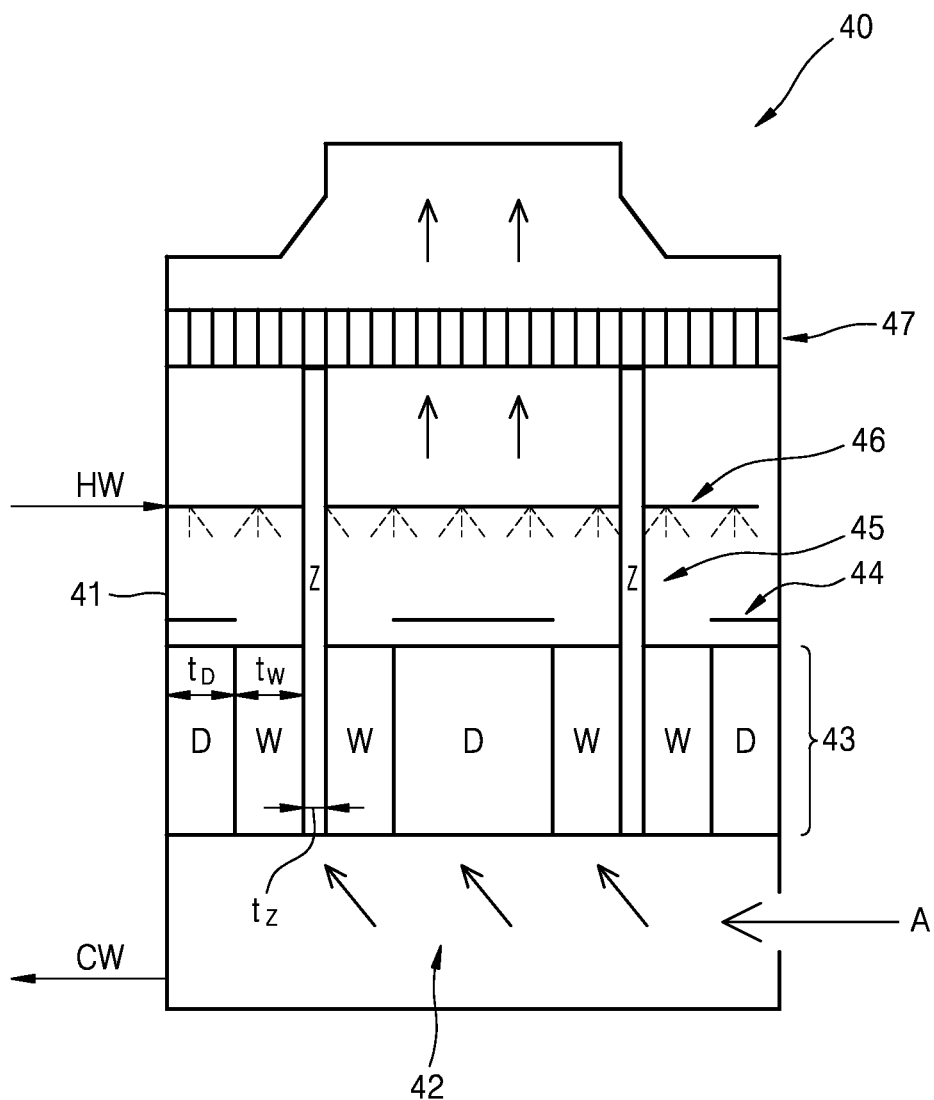
FIG. 4 is a diagram schematically illustrating a counterflow cooling tower having plume abating means according to another exemplary embodiment.

FIG. 4 is a diagram schematically illustrating a cooling tower having plume abating means 40 according to another exemplary embodiment.

Referring to FIG. 4, the cooling tower 40 includes a housing 41, an ambient air introducing/water collecting unit 42, a cooling unit 43, a plume generating unit 45, a cooling water distributing unit 46, a plume collecting unit 47, and an exhausting means (not shown). The exhausting means of the cooling tower 40 may be identical to or similar with that of the cooling tower 10 in FIG. 1, and thus a detailed description thereof will be omitted.

In addition, the cooling tower 40 may further include a cooling water blocking unit 44 and/or the above-described air distribution regulator.

The housing 41, the ambient air introducing/water collecting unit 42, the cooling unit 43, the cooling water blocking unit 44, the plume generating unit 45, the cooling water distributing unit 46, and the plume collecting unit 47 of FIG. 4 may be respectively identical to or similar with the housing 11, the ambient air introducing/water collecting unit 12, the cooling unit 13, the cooling water blocking unit 14, the plume generating unit 15, the cooling water distributing unit 16, and the plume collecting unit 17 of FIG. 1, and thus, detailed descriptions thereof will be omitted.

The cooling tower 40 of FIG. 4 is a modified embodiment of the cooling tower 30 of FIG. 3.

The cooling tower 40 of FIG. 4 is different from the cooling tower 30 of FIG. 3 as follows: a bottom end of a second dry unit Z of the cooling tower 40 is in contact with a top end of the ambient air introducing/water collecting unit 42; and a top end of the second dry unit Z of the cooling tower 40 is in contact with a bottom end of the plume collecting unit 47. However, the exemplary embodiment is not limited thereto, and the top end of the second dry unit Z of the cooling tower 40 may extend to any portion between the bottom and top ends of the plume collecting unit 47, or to the top portion of the plume collecting unit 47.

In addition, although not shown in FIG. 4, the cooling tower 40 of FIG. 4 may further include a material transferring means (e.g., at least one hole h) for transferring materials from a first dry unit D to a wet unit W and/or from the wet unit W to the first dry unit D of the cooling tower 40.

Figure 5A:
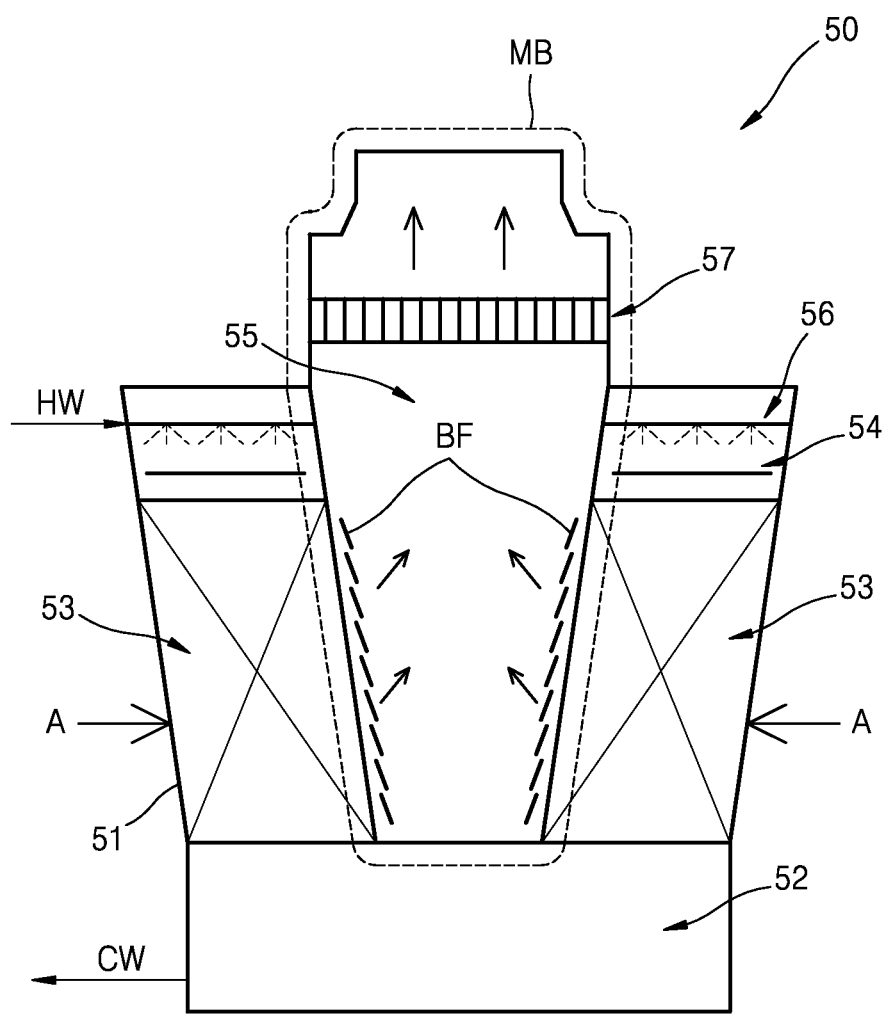
FIGS. 5A and 5B are diagrams each schematically illustrating a crossflow cooling tower according to another exemplary embodiment.
Figure 5B:
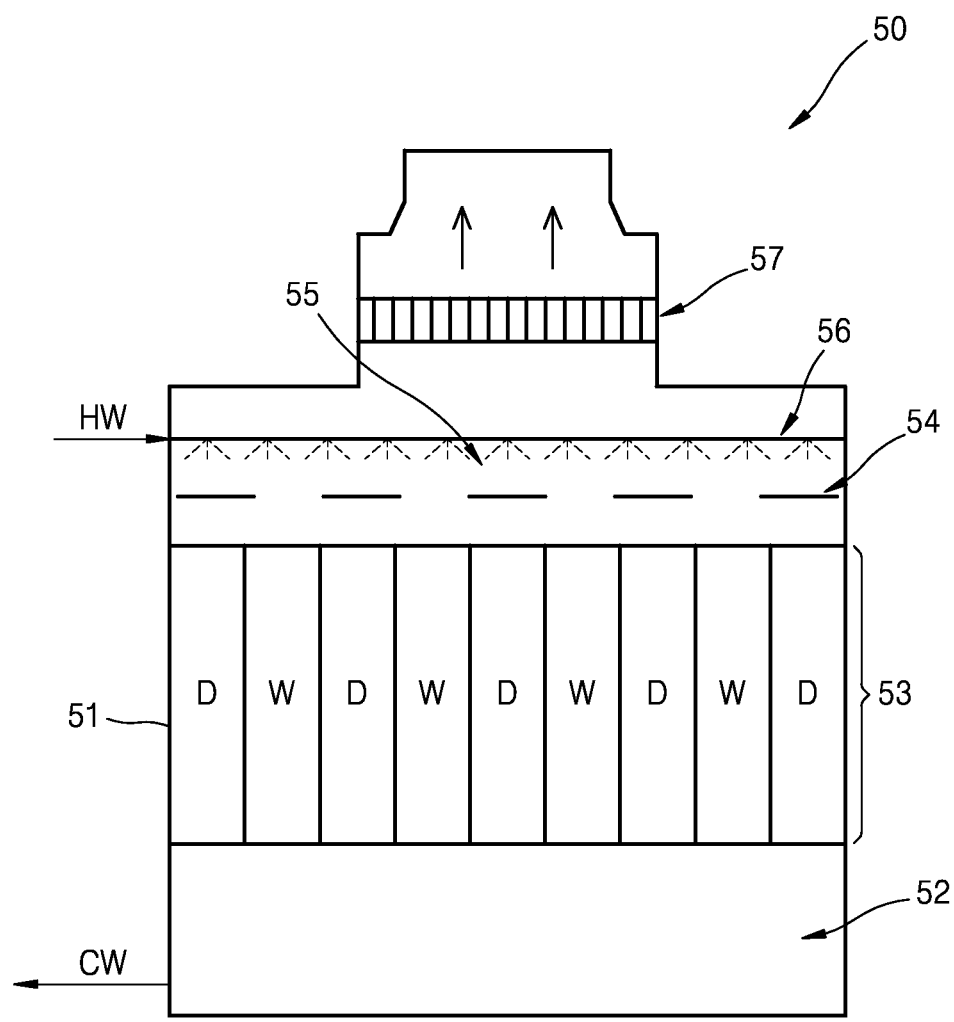

FIGS. 5A and 5B are diagrams each schematically illustrating a cooling tower 50 according to another exemplary embodiment. FIG. 5A is a front view of the cooling tower 50, and FIG. 5B is a side view of the cooling tower 50.

Referring to FIGS. 5A and 5B, the cooling tower 50 includes a housing 51, a water collecting unit 52, a cooling unit 53, a plume generating unit 55, a cooling water distributing unit 56, a plume collecting unit 57, and an exhausting means (not shown). The exhausting means of the cooling tower 50 may be identical to or similar with that of the cooling tower 10 in FIG. 1, and thus a detailed description thereof will be omitted.

In addition, the cooling tower 50 may further include a cooling water blocking unit 54 and/or the above-described air distribution regulator.

The housing 51, the cooling unit 53, the cooling water blocking unit 54, the plume generating unit 55, the cooling water distributing unit 56, and the plume collecting unit 57 of FIGS. 5A and 5B may be respectively identical to or similar with the housing 11, the cooling unit 13, the cooling water blocking unit 14, the plume generating unit 15, the cooling water distributing unit 16, and the plume collecting unit 17 of FIG. 1, and thus, detailed descriptions thereof will be omitted.

The cooling tower 50 of FIGS. 5A and 5B is different from the cooling tower 10 of FIG. 1 as follows: the cooling tower 50 is equipped with the water collecting unit 52 instead of the ambient air introducing/water collecting unit 12; ambient air A is introduced from an outer side surface of the cooling unit 53 instead of a bottom portion of the cooling unit 53; and the ambient air A passing through the cooling unit 53 sequentially passes through the plume generating unit 55 and the plume collecting unit 5,7 not via the cooling water distributing unit 56.

The plume generating unit 55 is a space formed between the cooling unit 53 and the plume collecting unit 57, wherein first air discharged from a wet unit W may be in contact with second air discharged from a dry unit D, thereby generating plume. As described above, the first air may have temperature and relative humidity that are much higher than those of the ambient air A, and the second air may have temperature and relative humidity that are slightly higher than or similar with those of the ambient air A. Thus, when the first air is in contact with the second air, plume is rapidly generated, thereby forming the plume generating unit 55.

The plume collecting unit 57 may be disposed inside or outside of the housing 51 and on top of the plume generating unit 55, so as to collect plume generated in the plume generating unit 57. Then, air from which the plume is removed in the plume collecting unit 57 is discharged to the atmosphere.

The plume collecting unit 57 may include an electrostatic precipitator (not shown). The electrostatic precipitator electrifies plume by arc discharge, corona discharge or so on, and then, the electrified plume is adsorbed onto an electrode plate (not shown) having an opposite polarity to polarity of the electrified plume so as to be collected.

The water collecting unit 52 is a place for collecting the low-temperature cooling water CW discharged from the cooling unit 53. The ambient air A may or may not enter the water collecting unit 52.

Although not shown in FIGS. 5A and 5B, the cooling tower 50 may further include a material transferring means (e.g., at least one hole) for transferring materials from the dry unit D to the wet unit W and/or from the wet unit W to the dry unit D of the cooling tower 50.

In addition, although not shown in FIGS. 5A and 5B, the dry unit D of the cooling tower 50 may consist of a first dry unit and a second dry unit in a similar manner as in the cooling tower 30 of FIG. 3 and the cooling tower 40 of FIG. 4, wherein the first dry unit may extend by the same length as the length of the wet unit W and the second dry unit may extend to the plume collecting unit 57. In an exemplary embodiment, a top portion of the second dry unit may be configured to protrude over a top portion of the plume collecting unit 57. In another exemplary embodiment, a top portion of the second dry unit may extend to a bottom portion of the plume collecting unit 57, to any portion between the top and bottom portions of the plume collecting unit 57, or to the top portion of the plume collecting unit 57.

In FIG. 5A, MB and BF each refer to a main body and a baffle.

In the cooling tower having plume abating means according to the one or more of the above embodiments of the present inventive concept, a large amount of plume is generated and removed before being discharged to the atmosphere so that the generation of plume may be minimized when the air discharged from the cooling tower is exhausted to the atmosphere, and the cooling water discharged to the atmosphere may be partially recollected.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A cooling tower comprising:
  a housing;
  a cooling unit disposed inside of the housing and configured to convert high-temperature cooling water into low-temperature cooling water by contacting it with ambient air, wherein the cooling unit comprises a wet unit and a dry unit that limit or block transfer of materials therebetween;
  a cooling water distributing unit for spraying cooling water to the cooling unit;
  a plume generating unit for generating plume by contacting first air with second air, wherein the first air is discharged from the wet unit and the second air is discharged from the dry unit;
  a plume collecting unit disposed inside or outside of the housing and configured to collect plume generated in the plume generating unit; and an exhausting means disposed in a front end or back end of the plume collecting unit.

2. The cooling tower of claim 1, further comprising a cooling water blocking unit disposed between the cooling unit and the cooling water distributing unit and configured to block the cooling water sprayed from the cooling water distributing unit from flowing into the dry unit.

3. The cooling tower of claim 1, wherein a thickness of each of the wet unit and the dry unit is in a range of about 10 cm to about 300 cm.

4. The cooling tower of claim 3, wherein a ratio of a thickness of the wet unit to a thickness of the dry unit is in a range of about 1:0.2 to about 0.2:1.

5. The cooling tower of claim 1, wherein temperature and relative humidity of the first air are each higher than those of the second air.

6. The cooling tower of claim 1, further comprising a material transferring means for transferring materials from the dry unit to the wet unit or from the wet unit to the dry unit.

7. The cooling tower of claim 1, wherein the dry unit comprises a first dry unit and a second dry unit, wherein the first dry unit is disposed at a bottom portion of the cooling water distributing unit and the second dry unit extends to the plume collecting unit.

8. The cooling tower of claim 7, wherein a top portion of the second dry unit is configured to protrude over a top portion of the plume collecting unit.

9. The cooling tower of claim 7, wherein a top portion of the second dry unit extends to a bottom portion of the plume collecting unit, to any one portion between bottom and top portions of the plume collecting unit, or to a top portion of the plume collecting unit.

10. The cooling tower of claim 7, wherein a thickness of each of the wet unit and the first dry unit is in a range of about 10 cm to about 300 cm, and a thickness of the second dry unit is in a range of about 5 cm to about 60 cm.

11. The cooling tower of claim 1, wherein the plume collecting unit comprises an electrostatic precipitator.

12. The cooling tower of claim 1, wherein the plume collecting unit is disposed on a top portion of the cooling water distributing unit.

13. The cooling tower of claim 1, further comprising an air distribution regulator for regulating a proportion of air flowing into each of the wet unit and the dry unit.

14. The cooling tower of claim 1, wherein the cooling tower is configured to allow the ambient air to pass through the cooling unit, the plume generating unit, the cooling water distributing unit, and the plume collecting unit sequentially in the stated order.

15. The cooling tower of claim 1, wherein the cooling tower is configured to allow the ambient air to pass through the cooling unit, the plume generating unit and the plume collecting unit sequentially in the stated order, not via the cooling water distributing unit.

* * * * *